United States Patent
Kang

(10) Patent No.: US 11,801,855 B2
(45) Date of Patent: Oct. 31, 2023

(54) EXIT WARNING SYSTEM AND CONTROL METHOD THEREOF

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/584,944

(22) Filed: Jan. 26, 2022

(65) Prior Publication Data

US 2022/0242434 A1    Aug. 4, 2022

(30) Foreign Application Priority Data

Feb. 3, 2021   (KR) .................. 10-2021-0015572

(51) Int. Cl.
| | |
|---|---|
| *B60W 50/14* | (2020.01) |
| *B60W 40/02* | (2006.01) |
| *G08B 21/18* | (2006.01) |
| *B60W 40/08* | (2012.01) |

(52) U.S. Cl.
CPC ............ *B60W 50/14* (2013.01); *B60W 40/02* (2013.01); *B60W 40/08* (2013.01); *G08B 21/182* (2013.01); *B60W 2554/80* (2020.02)

(58) Field of Classification Search
CPC ...... B60W 50/14; B60W 40/02; B60W 40/08; B60W 2554/80; G08B 21/182
USPC ...................................................... 340/573.1
See application file for complete search history.

(56) References Cited

U.S. PATENT DOCUMENTS

| | | | | |
|---|---|---|---|---|
| 7,616,781 B2* | 11/2009 | Schofield | ............... | H04N 23/54 |
| | | | | 382/172 |
| 10,086,833 B1* | 10/2018 | Duan | ....................... | G01S 17/87 |
| 11,535,246 B2* | 12/2022 | Sherrit | ................. | B60W 50/16 |
| 2005/0218660 A1* | 10/2005 | Ijuin | ....................... | E05B 77/26 |
| | | | | 292/201 |
| 2008/0218381 A1* | 9/2008 | Buckley | ................. | B60Q 1/544 |
| | | | | 340/932.2 |
| 2012/0065858 A1* | 3/2012 | Nickolaou | ............. | B60Q 9/008 |
| | | | | 701/1 |
| 2013/0234844 A1* | 9/2013 | Yopp | ....................... | B60Q 9/008 |
| | | | | 340/435 |
| 2016/0189496 A1* | 6/2016 | Modi | ..................... | G08B 13/22 |
| | | | | 340/545.2 |
| 2017/0193824 A1* | 7/2017 | Wu | ........................ | B60Q 5/006 |
| 2017/0305343 A1* | 10/2017 | Wu | ........................ | B60Q 9/008 |
| 2018/0215377 A1* | 8/2018 | Gao | ................. | B60W 50/0098 |
| 2019/0023207 A1* | 1/2019 | Lambermont | ....... | G08B 21/182 |

(Continued)

FOREIGN PATENT DOCUMENTS

KR    10-1521870 B1    5/2015

*Primary Examiner* — Zhen Y Wu
(74) *Attorney, Agent, or Firm* — NSIP Law

(57) ABSTRACT

An exit warning system and a control method thereof are proposed to prevent a malfunction of a SEA system by distinguishing a person approaching a host vehicle from another vehicle, where the warning system includes a target detection sensor configured to detect a target approaching a host vehicle, and a controller configured to control not to transmit a warning signal of a safety exit assist system, in response to a speed of the target is less than or equal to a threshold speed and a position of the target is positioned within a distance from a vehicle door of the host vehicle.

11 Claims, 3 Drawing Sheets

(56) References Cited

U.S. PATENT DOCUMENTS

2019/0211587 A1* 7/2019 Ganeshan .............. B60Q 5/006
2021/0354625 A1* 11/2021 ElShenawy ............. G01S 17/87

* cited by examiner

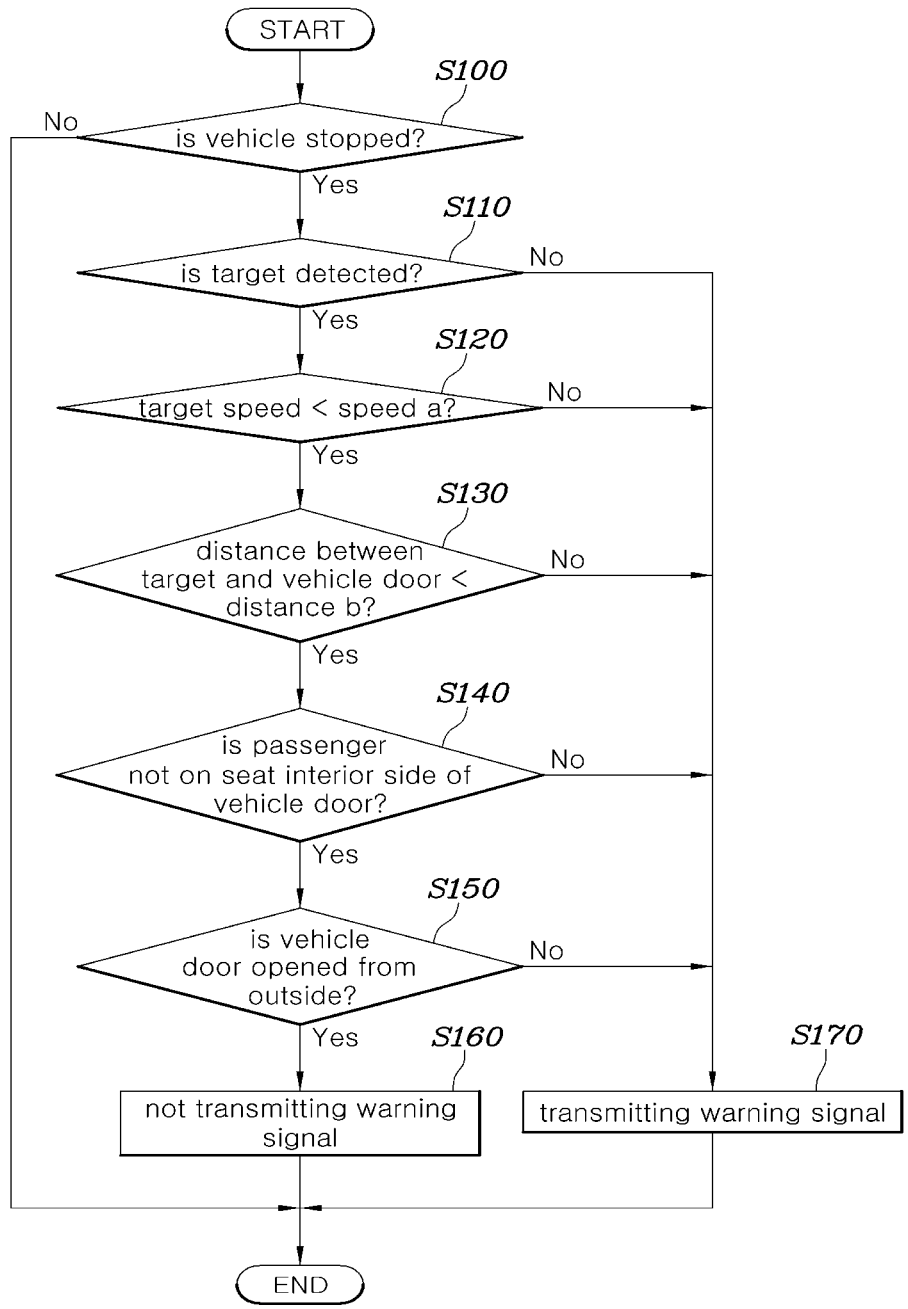

EXIT WARNING SYSTEM AND CONTROL METHOD THEREOF

CROSS REFERENCE TO RELATED APPLICATION

The application claims the benefit under 35 USC § 119(a) of Korean Patent Application No. 10-2021-0015572, filed on Feb. 3, 2021, in the Korean Intellectual Property Office, the entire disclosure of which is incorporated herein by reference for all purposes.

BACKGROUND

1. Field

The present invention relates to an exit warning system and a control method thereof that prevent a malfunction of a Safety Exit Assist (SEA) system by distinguishing a person approaching a host vehicle from another vehicle.

2. Description of Related Art

The SEA system is a system wherein, in a case where another vehicle is approaching from the rear of a host vehicle when the host vehicle is stopped and a passenger gets off from a rear seat thereof, the system assists the passenger in getting off safely by keeping a rear seat door locked with a warning, so as to prevent a collision accident.

However, there is a problem in that even in a case where a driver or a passenger who desires to board a host vehicle is approaching, the SEA system malfunctions due to an error in recognizing the driver or the passenger as another vehicle.

Certainly, it may be possible that a person approaching the host vehicle is identified and distinguished from another vehicle by applying an ultra-high-resolution mode, but this method has a problem in that the amount of memory required and the amount of computation required are increased, thereby making the system complex and heavy.

The foregoing is intended merely to aid in the understanding of the background of the present invention, and is not intended to mean that the present invention falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an exit warning system including a target detection sensor configured to detect a target approaching a host vehicle, and a controller configured to control not to transmit a warning signal of a safety exit assist system, in response to a speed of the target is less than or equal to a threshold speed and a position of the target is positioned within a distance from a vehicle door of the host vehicle.

The controller may include a calculator configured to calculate the position and the speed of the target on the basis of a position of the host vehicle and target information detected by the target detection sensor, a condition determiner configured to determine conditions based on whether the speed of the target is less than or equal to the threshold speed and whether the position of the target is positioned within the distance from the vehicle door, a correlation determiner configured to determine the target as a person having a correlation with the host vehicle, in response to a condition from among conditions determined by the condition determiner being satisfied, and a warning transmitter configured to control not to transmit the warning signal by transmitting a Safety Exit Assist (SEA) warning signal as a value zero, in response to determining the target being the person having the correlation with the host vehicle.

The exit warning system may include a passenger detection sensor configured to detect a passenger on a seat, and to detect whether the seat is adjacent to an interior side of the vehicle door to which the target is approaching, wherein the controller is further configured to control not to transmit the warning signal of the safety exit assist system, in response to the passenger not being on the seat adjacent to the interior side of the vehicle door.

The controller may be configured to determine whether the vehicle door to which the target is approaching is opened from outside of the host vehicle, and control not to transmit the warning signal of the safety exit assist system, in response to the vehicle door being opened from the outside.

The controller may be configured to determine whether the vehicle door to which the target is approaching is opened from outside of the host vehicle, and control not to transmit a warning signal of a safety exit assist system, in response to the vehicle door being opened from the outside.

In another general aspect, there is provided an exit warning system including a target detection sensor configured to detect a target approaching a host vehicle, and a controller configured to control not to transmit a warning signal of a safety exit assist system based on any one or any combination of a first condition that a speed of the target is less than or equal to a threshold speed, a second condition that a position of the target is positioned within a distance from a vehicle door of the host vehicle, a third condition that a passenger is not on a seat adjacent to an interior side of the vehicle door to which the target is approaching, and a fourth condition that the vehicle door to which the target is approaching is opened from outside of the host vehicle.

In another general aspect, there is provided a processor-implemented control method for an exit warning system, the method including detecting, by a target detection sensor, a target, wherein the target approaching a host vehicle, and controlling, by a controller, not to transmit a warning signal of a safety exit assist system, in response to a speed of the target being less than or equal to a threshold speed and a position of the target is positioned within a distance from a vehicle door.

The controlling of the warning may include calculating the position and the speed of the target on the basis of the position of the host vehicle and target information detected by the target detection sensor, determining conditions based on whether the speed of the target is less than or equal to the threshold speed and whether the position of the target is positioned within the distance from the vehicle door, determining a correlation, wherein the target is determined as a person having the correlation with the host vehicle, in response to a condition from among the conditions being satisfied, and transmitting the warning as a Safety Exit Assist (SEA) warning signal having a value zero, in response to the target being determined as the person having the correlation with the host vehicle, to control not to transmit the warning signal.

The method may include detecting a passenger on a seat by the passenger detection sensor, determining whether the seat is adjacent to an interior side of the vehicle door to which the target is approaching, and controlling not to transmit the warning signal of the safety exit assist system, in response to the passenger not being on the seat adjacent to the interior side of the vehicle door.

The method may include determining whether the vehicle door to which the target is approaching is opened from outside of the host vehicle, and controlling not to transmit the warning signal of the safety exit assist system, in response to the vehicle door being opened from the outside.

The method may include determining whether the vehicle door to which the target is approaching is opened from outside of the host vehicle, and controlling not to transmit the warning signal of the safety exit assist system, in response to the vehicle door being opened from the outside.

In another general aspect, there is provided a control method for an exit warning system, the method including detecting a target approaching a host vehicle by a target detection sensor, and controlling not to transmit a warning signal of a safety exit assist (SEA) system based on any one or any combination of a first condition that a speed of the target is less than or equal to a threshold speed, a second condition that a position of the target is positioned within a distance from a vehicle door of the host vehicle, a third condition that a passenger is not on a seat adjacent to an interior side of the vehicle door to which the target is approaching, and a fourth condition that the vehicle door to which the target is approaching is opened from outside of the host vehicle.

Other features and aspects will be apparent from the following detailed description, the drawings, and the claims.

BRIEF DESCRIPTION OF DRAWINGS

FIG. 3 is an example of a flowchart illustrating a control process of the exit warning system.

DETAILED DESCRIPTION

Figure 1:
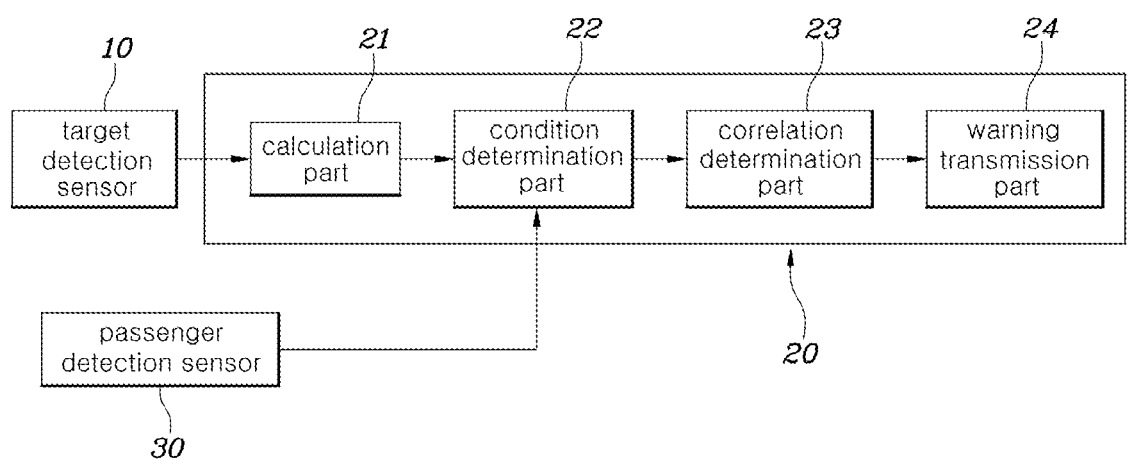
FIG. 1 is an example of an exit warning system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Specific structural and functional descriptions of the embodiments of the present invention disclosed herein are only for illustrative purposes of the embodiments of the present invention. The present invention may be embodied in many different forms. Therefore, the embodiments of the present invention should not be construed as limiting the present invention.

Since the exemplary embodiments of the present invention can be variously modified in many different forms, specific exemplary embodiments will be illustrated in the drawings and described in detail in the specification or application of the present invention. However, this is not intended to limit the exemplary embodiments in accordance with the concept of the present invention to a particular disclosed form. On the contrary, the present invention is to be understood to include all various alternatives, equivalents, and substitutes that may be included within the spirit and scope of the present invention.

Although the terms "first", "second", etc. may be used herein to describe various components, these components should not be limited by these terms. These terms are only used to distinguish one component from another component. For instance, a first component discussed below could be termed a second component without departing from the scope of rights according to the concept of the present invention. Similarly, the second component could also be termed the first component.

It will be understood that when a component is referred to as being "coupled" or "connected" to another component, it can be directly coupled or connected to the other component or intervening components may be present. In contrast, it should be understood that when a component is referred to as being "directly coupled" or "directly connected" to another component, there are no intervening components present. Other expressions that explain the relationship between components, such as "between", "directly between", "adjacent to", or "directly adjacent to" should be construed in the same way.

The terminology used herein is for the purpose of describing particular exemplary embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meaning as commonly understood by those skilled in the art to which this invention belongs. It will be further understood that terms, such as those defined in commonly used dictionaries, should be interpreted as having a meaning that is consistent with their meaning in the context of the related art, and will not be interpreted in an idealized or overly formal sense unless expressly so defined herein.

FIG. 1 is a block diagram of an exit warning system according to the present invention.

Referring to the drawings, the present invention is configured to include: a target detection sensor 10 configured to detect a target approaching a host vehicle; and a controller 20 configured to control not to transmit a warning signal of a safety exit assist (SEA, hereinafter referred to as "SEA") system when a target speed is less than or equal to a predetermined speed and a target position is positioned within a predetermined distance from a vehicle door.

Specifically, the target detection sensor 10 may be a radar device installed in an outer side of a host vehicle to detect another vehicle approaching the rear side of the host vehicle.

In addition, the controller 20 may be configured to include a calculation part 21 (also referred to as the "calculator 21"), a condition determination part 22 (also referred to as the "condition determiner 22"), a correlation determination part 23 (also referred to as the "correlation determiner 23"), and a warning transmission part 24 (also referred to as the "warning transmitter 24").

On the basis of a position of the host vehicle and information detected by the target detection sensor 10, the calculation part 21 may calculate not only a position and speed of a target but also the time until the target reaches the host vehicle.

The condition determination part 22 determines whether a SEA warning condition is satisfied on the basis of the target information, and may determine whether the target enters a warning area of the host vehicle, and may determine whether the time until the target reaches the host vehicle is within a threshold value.

In particular, the condition determination part 22 may determine whether the speed of the target is less than or equal to a predetermined speed, and may determine whether the position of the target is positioned within a predetermined distance from a vehicle door of the host vehicle.

The correlation determination part 23 determines whether there are conditions that satisfy minimum standard conditions among the conditions determined by the condition determination part 22, and when the standard conditions are satisfied, the correlation determination part 23 determines that the target is a person who has a correlation with the host vehicle.

For example, when the target is a human, a target speed should be less than or equal to a speed that a person may be able to achieve when running. Accordingly, when the target speed is less than or equal to the predetermined speed, it may be determined that the target has a correlation with the host vehicle.

In addition, when the target is a person, the person must be at a position very close to the vehicle door, so when the target is positioned adjacent to the host vehicle, it may be determined that the target has the correlation with the host vehicle.

The warning transmission part 24 controls not to transmit a warning signal by transmitting a SEA warning signal as a value zero when the correlation determination part 23 determines that the target is the person related to the host vehicle.

Certainly, the warning transmission part 24 controls to transmit a warning signal by transmitting the SEA warning signal as a value one when the correlation determination part 23 determines that the target is another vehicle or an object similar to a vehicle (e.g., motorcycle, bicycle, etc.) having a risk of collision.

That is, a target approaching the host vehicle may be classified into a person and another object on the basis of the target information on the target approaching the host vehicle.

Accordingly, when the target approaching the host vehicle is the person such as a driver or a passenger, misrecognition and malfunction of the SEA is prevented by controlling not to transmit the warning signal of the SEA.

As a reference, the controller 20 according to the exemplary embodiment of the present invention may be implemented through components including: a nonvolatile memory (not shown) configured to store data related to an algorithm developed to control operations of various components of a vehicle or software instructions for reproducing the algorithm; and a processor (not shown) configured to perform the operations described below using data stored in the corresponding memory. Here, the memory and the processor may be implemented as separate chips. In the alternative, the memory and the processor may be implemented as a single chip integrated with each other. The processor may take a configuration having one or more processors.

In addition, the present invention includes a passenger detection sensor 30 configured to detect a passenger on a seat, and further determines whether the passenger is on the seat adjacent to the interior side of a vehicle door to which the target is approaching.

Here, the passenger detection sensor 30 may be a passenger presence detector (PPD) installed on a seat cushion to determine whether or not a passenger is on board when an airbag is operated.

For example, in a case where the passenger is not on a seat adjacent to the interior side of the vehicle door to be opened, there is a high probability that the vehicle door will not be opened from the inside, and conversely, in a case where the passenger is on the seat adjacent to the interior side of the vehicle door, the probability of opening the vehicle door from the inside is relatively high, so the condition determination part 22 may additionally determine the passenger boarding conditions.

Moreover, the present invention may further determine whether the vehicle door to which the target is approaching is opened from the outside of the host vehicle.

That is, in a case where the vehicle door is opened from the outside of the host vehicle, since such a condition is not dangerous enough to cause a collision due to opening of the vehicle door, the condition determination part 22 may additionally determine this case.

Meanwhile, the present invention is configured to include a target detection sensor 10 configured to detect a target approaching a host vehicle and a controller 20 configured to control not to transmit a warning signal of the safety exit assist system when satisfying at least one or more of conditions including: a first condition that a speed of a target is less than or equal to a predetermined speed; a second condition that a position of the target is positioned within a predetermined distance from a vehicle door; a third condition that a passenger is not on a seat adjacent to the interior side of the vehicle door to which the target is approaching; and a fourth condition that the vehicle door to which the target is approaching is opened from the outside of the host vehicle.

That is, when all of the first to fourth conditions are satisfied, the SEA warning signal may not be transmitted, but without having to satisfy all of these conditions, when at least one or more of conditions of the first to fourth conditions are satisfied, the SEA warning signal may be controlled not to transmit the SEA warning signal.

Figure 2:
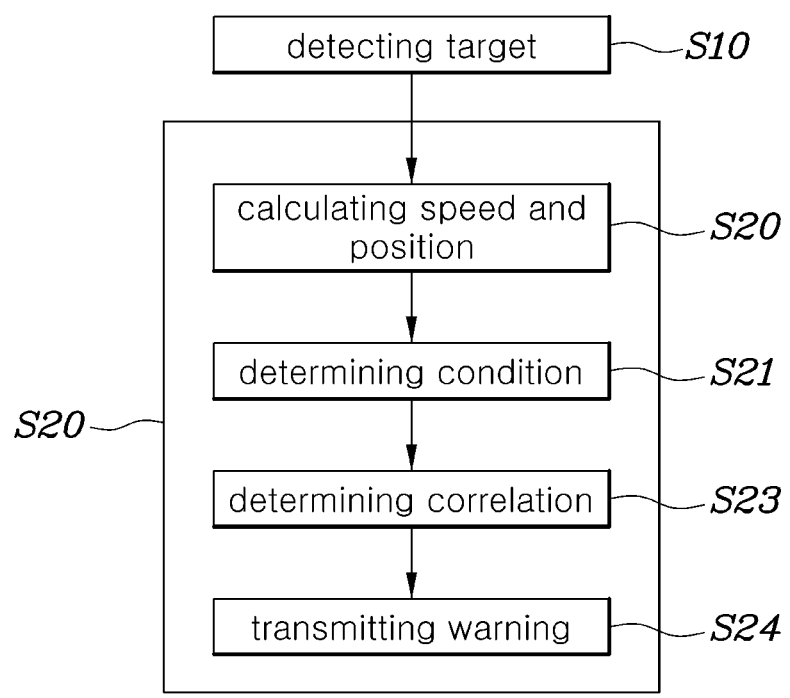
FIG. 2 is an example of a control method of the exit warning system.

Meanwhile, FIG. 2 is a block diagram of a control method of the exit warning system according to the present invention.

Referring to the drawings, the control method of the exit warning system according to the present invention is configured to include: step S10 of detecting a target, wherein a target approaching a host vehicle is detected by a target detection sensor 10; and step S20 of controlling a warning, wherein when a speed of the target is less than or equal to a predetermined speed and a position of the target is positioned within a predetermined distance from a vehicle door, a controller 20 controls not to transmit a warning signal of a safety exit assist system.

Specifically, step S20 of the controlling of the warning is configured to include: step S21 of calculating a speed, wherein a position and the speed of a target are calculated on the basis of a position of a host vehicle and information detected by a target detection sensor 10; step S22 of determining a condition, wherein, on the basis of the target information generated in step S21 of the calculating of the speed, whether the speed of the target is less than or equal to a predetermined speed is determined, and whether the position of the target is positioned within a predetermined distance from a vehicle door of the host vehicle is determined; step S23 of determining a correlation, wherein the target is determined as a person having a correlation with the host vehicle when a minimum standard condition set among conditions determined in step S22 of the determining of the condition is satisfied; and step S24 of transmitting a warning, wherein when the target is determined as the person related to the host vehicle, a SEA warning signal is transmitted as a value zero, so as to control not to transmit the warning signal.

FIG. 3 is a view illustrating an overall control process of the exit warning system according to the present invention.

Accordingly, when described with reference to the drawings, in step S100, it is determined whether a host vehicle is stopped, and in step S110, when it is determined that the host vehicle is stopped, a target approaching the host vehicle is monitored by using a sensor such as a radar device installed in the host vehicle.

Accordingly, in step S120, when the target is detected in the step of the monitoring of the target, it is determined whether a speed of the target is less than or equal to speed a.

As a result of the determination in step S120, when the speed of the target is less than or equal to the speed a, it is determined whether a distance between the target and the vehicle door of the host vehicle is less than or equal to a distance b in step S130.

As a result of the determination in step S130, when the distance between the target and the vehicle door of the host vehicle is less than or equal to the distance b, it is determined, by using a passenger detection sensor 30, whether a passenger is not on a seat adjacent to the interior side of the vehicle door, to which the target is approaching, in step S140.

As a result of the determination in step S140, when the passenger is not on the seat, it is determined whether or not the vehicle door is opened from the outside of the host vehicle in step S150.

As a result of the determination in step S150, when the vehicle door is opened from the outside of the host vehicle, a SEA warning signal is transmitted as a value zero, so as to control not to transmit the warning signal in step S160.

Whereas, when the corresponding conditions are not satisfied in the above steps S110, S120, S130, and S140, the SEA warning signal is transmitted as a value one, so as to control to transmit the warning signal in step S170.

As described above, in the present invention, when determining a target approaching a host vehicle as a person such as a driver or a passenger on the basis of target information on the target approaching the host vehicle, misrecognition and malfunction of the SEA are prevented by controlling not to transmit the warning signal of the SEA, thereby improving the reliability and merchantability of the system.

As described above, the exit warning system and a control method thereof that prevent a malfunction of a SEA system by distinguishing a person approaching a host vehicle from another vehicle.

Through the above-described problem solutions, when determining a target approaching a host vehicle as a person such as a driver or a passenger on the basis of target information on the target approaching the host vehicle, the present invention prevents misrecognition and malfunction of the SEA by controlling not to transmit a warning signal of the SEA, so that there is an effect of improving the reliability and merchantability of the system.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the lane recognition method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An exit warning system comprising:
   a target detection sensor configured to detect a target approaching a host vehicle; and
   a controller configured to control not to transmit a warning signal of a safety exit assist system, in response to a speed of the target being less than or equal to a threshold speed and the target being positioned within a distance from a vehicle door of the host vehicle,
   wherein the controller comprises:
      a calculator configured to calculate the position and the speed of the target on the basis of a position of the host vehicle and target information detected by the target detection sensor;
      a condition determiner configured to determine conditions based on whether the speed of the target is less than or equal to the threshold speed and whether the position of the target is positioned within the distance from the vehicle door;
      a correlation determiner configured to determine the target as a person having a correlation with the host vehicle, in response to a condition from among conditions determined by the condition determiner being satisfied; and
      a warning transmitter configured to control not to transmit the warning signal by transmitting a Safety Exit Assist (SEA) warning signal as a zero value, in response to the determining of the target being the person having the correlation with the host vehicle.

2. The exit warning system of claim 1, further comprising:
   a passenger detection sensor configured to:
      detect a passenger on a seat; and
      detect whether the seat is adjacent to an interior side of the vehicle door to which the target is approaching,
   wherein the controller is further configured to control not to transmit the warning signal of the safety exit assist system, in response to the passenger not being on the seat adjacent to the interior side of the vehicle door.

3. The exit warning system of claim 1, wherein the controller is further configured to:
   determine whether the vehicle door to which the target is approaching is opened from outside of the host vehicle; and
   control not to transmit the warning signal of the safety exit assist system, in response to the vehicle door being opened from the outside.

4. The exit warning system of claim 2, wherein the controller is further configured to:
   determine whether the vehicle door to which the target is approaching is opened from outside of the host vehicle; and
   control not to transmit a warning signal of a safety exit assist system, in response to the vehicle door being opened from the outside.

5. An exit warning system comprising:
   a target detection sensor configured to detect a target approaching a host vehicle; and
   a controller configured to control not to transmit a warning signal of a safety exit assist system based on any one or any combination of
      a first condition that a speed of the target is less than or equal to a threshold speed,
      a second condition that a position of the target is positioned within a distance from a vehicle door of the host vehicle,
      a third condition that a passenger is not on a seat adjacent to an interior side of the vehicle door to which the target is approaching, and
      a fourth condition that the vehicle door to which the target is approaching is opened from outside of the host vehicle,
   wherein the controller comprises:
      a calculator configured to calculate the position and the speed of the target on the basis of a position of the host vehicle and target information detected by the target detection sensor;
      a condition determiner configured to determine conditions based on whether the speed of the target is less than or equal to the threshold speed and whether the position of the target is positioned within the distance from the vehicle door;
      a correlation determiner configured to determine the target as a person having a correlation with the host vehicle, in response to a condition from among conditions determined by the condition determiner being satisfied; and
      a warning transmitter configured to control not to transmit the warning signal by transmitting a Safety Exit Assist (SEA) warning signal as a value zero, in response to determining the target being the person having the correlation with the host vehicle.

6. A processor-implemented control method for an exit warning system, the method comprising:
   detecting, by a target detection sensor, a target, wherein the target approaching a host vehicle; and
   controlling, by a controller, not to transmit a warning signal of a safety exit assist system, in response to a speed of the target being less than or equal to a threshold speed and a position of the target being positioned within a distance from a vehicle door,
   wherein the controller comprises:
      a calculator configured to calculate the position and the speed of the target on the basis of a position of the host vehicle and target information detected by the target detection sensor;
      a condition determiner configured to determine conditions based on whether the speed of the target is less than or equal to the threshold speed and whether the position of the target is positioned within the distance from the vehicle door;
      a correlation determiner configured to determine the target as a person having a correlation with the host vehicle, in response to a condition from among conditions determined by the condition determiner being satisfied; and
      a warning transmitter configured to control not to transmit the warning signal by transmitting a Safety Exit Assist (SEA) warning signal as a value zero, in response to determining the target being the person having the correlation with the host vehicle.

7. The method of claim 6, further comprising:
detecting a passenger on a seat by the passenger detection sensor; and
determining whether the seat is adjacent to an interior side of the vehicle door to which the target is approaching,
wherein the controlling not to transmit the warning signal comprises controlling not to transmit the warning signal of the safety exit assist system, in response to the passenger not being on the seat adjacent to the interior side of the vehicle door.

8. The method of claim 6, further comprising:
determining whether the vehicle door to which the target is approaching is opened from outside of the host vehicle,
wherein the controlling not to transmit the warning signal comprises controlling not to transmit the warning signal of the safety exit assist system, in response to the vehicle door being opened from the outside.

9. The method of claim 7, further comprising:
determining whether the vehicle door to which the target is approaching is opened from outside of the host vehicle,
wherein the controlling not to transmit the warning signal comprises controlling not to transmit the warning signal of the safety exit assist system, in response to the vehicle door being opened from the outside.

10. A control method for an exit warning system, the method comprising:
detecting a target approaching a host vehicle by a target detection sensor; and
controlling not to transmit a warning signal of a safety exit assist (SEA) system based on any one or any combination of a first condition that a speed of the target is less than or equal to a threshold speed,
a second condition that a position of the target is positioned within a distance from a vehicle door of the host vehicle,
a third condition that a passenger is not on a seat adjacent to an interior side of the vehicle door to which the target is approaching, and
a fourth condition that the vehicle door to which the target is approaching is opened from outside of the host vehicle,
wherein the controlling comprises:
calculating the position and the speed of the target on the basis of a position of the host vehicle and target information detected by the target detection sensor;
determining conditions based on whether the speed of the target is less than or equal to the threshold speed and whether the position of the target is positioned within the distance from the vehicle door;
determining the target as a person having a correlation with the host vehicle, in response to a condition from among the determined conditions being satisfied; and
controlling not to transmit the warning signal by transmitting a Safety Exit Assist (SEA) warning signal as a value zero, in response to determining the target being the person having the correlation with the host vehicle.

11. The exit warning system of claim 1, wherein the safety exist system is further configured to keep a rear seat door locked with a warning in response to the warning signal.

* * * * *